(12) United States Patent
Lee et al.

(10) Patent No.: US 9,039,371 B2
(45) Date of Patent: May 26, 2015

(54) TRAILING EDGE COOLING USING ANGLED IMPINGEMENT ON SURFACE ENHANCED WITH CAST CHEVRON ARRANGEMENTS

(71) Applicants: Ching-Pang Lee, Cincinnati, OH (US); Benjamin E. Heneveld, Newmarket, NH (US); Glenn E. Brown, West Palm Beach, FL (US); Jill Klinger, Charlottesville, VA (US)

(72) Inventors: Ching-Pang Lee, Cincinnati, OH (US); Benjamin E. Heneveld, Newmarket, NH (US); Glenn E. Brown, West Palm Beach, FL (US); Jill Klinger, Charlottesville, VA (US)

(73) Assignees: SIEMENS AKTIENGESELLSCHAFT, München (DE); MIKRO SYSTEMS, INC., Charlottesville, VA (US)

( * ) Notice: Subject to any disclaimer, the term of this patent is extended or adjusted under 35 U.S.C. 154(b) by 21 days.

(21) Appl. No.: 14/068,070

(22) Filed: Oct. 31, 2013

(65) Prior Publication Data
US 2015/0118034 A1    Apr. 30, 2015

(51) Int. Cl.
*F01D 5/18*    (2006.01)
*F01D 9/02*    (2006.01)

(52) U.S. Cl.
CPC ....... *F01D 5/187* (2013.01); *F01D 9/02* (2013.01); *F05D 2260/201* (2013.01)

(58) Field of Classification Search
CPC ... F01D 5/186; F01D 5/187; F05D 2240/304; F05D 2250/183; F05D 2260/201; F05D 2260/202
USPC ..................................................... 416/97 R
See application file for complete search history.

(56) References Cited

U.S. PATENT DOCUMENTS

| | | | |
|---|---|---|---|
| 3,240,468 A | | 3/1966 | Watts et al. |
| 4,118,146 A | | 10/1978 | Dierberger |
| 4,183,716 A | | 1/1980 | Takahara et al. |
| 4,236,870 A | | 12/1980 | Hucul, Jr. et al. |
| 4,297,077 A | | 10/1981 | Durgin et al. |
| 4,770,608 A | | 9/1988 | Anderson et al. |
| 5,246,340 A | | 9/1993 | Winstanley et al. |
| 5,263,820 A | * | 11/1993 | Tubbs .................. 416/97 R |
| 5,356,265 A | | 10/1994 | Kercher |

(Continued)

FOREIGN PATENT DOCUMENTS

| | | |
|---|---|---|
| EP | 1079071 A2 | 2/2001 |
| EP | 1327747 A2 | 7/2003 |
| EP | 1793083 A2 | 6/2007 |

OTHER PUBLICATIONS

R.Roy, et al, "Designing a Turbine Blade Cooling System Using a Generalised Regression Genetic Algorithm", CIRP Annals, 2003, vol. 52/1, p. 415-418.

*Primary Examiner* — Liam McDowell

(57) ABSTRACT

A gas turbine engine component, including: a pressure side (12) having an interior surface (34); a suction side (14) having an interior surface (36); a trailing edge portion (30); and a plurality of suction side and pressure side impingement orifices (24) disposed in the trailing edge portion (30). Each suction side impingement orifice is configured to direct an impingement jet (48) at an acute angle (52) onto a target area (60) that encompasses a tip (140) of a chevron (122) within a chevron arrangement (120) formed in the suction side interior surface. Each pressure side impingement orifice is configured to direct an impingement jet at an acute angle onto an elongated target area that encompasses a tip of a chevron within a chevron arrangement formed in the pressure side interior surface.

18 Claims, 4 Drawing Sheets

(56) References Cited

U.S. PATENT DOCUMENTS

| | | |
|---|---|---|
| 5,702,232 A | 12/1997 | Moore |
| 5,931,638 A | 8/1999 | Krause et al. |
| 6,174,134 B1 | 1/2001 | Lee et al. |
| 6,206,638 B1 | 3/2001 | Glynn et al. |
| 6,234,754 B1 | 5/2001 | Zelesky et al. |
| 6,254,346 B1 | 7/2001 | Fukuno et al. |
| 6,273,682 B1 * | 8/2001 | Lee ............................ 416/97 R |
| 6,439,847 B2 | 8/2002 | Taeck |
| 6,607,356 B2 | 8/2003 | Manning et al. |
| 6,779,597 B2 | 8/2004 | DeMarche et al. |
| 7,056,083 B2 | 6/2006 | Gray |
| 7,128,533 B2 | 10/2006 | Liang |
| 7,334,992 B2 | 2/2008 | Downs et al. |
| 7,670,112 B2 | 3/2010 | Boury et al. |
| 7,690,892 B1 * | 4/2010 | Liang ................................ 416/1 |
| 7,862,299 B1 * | 1/2011 | Liang ........................... 416/97 R |
| 8,052,378 B2 * | 11/2011 | Draper ........................... 415/115 |
| 8,096,767 B1 * | 1/2012 | Liang ........................... 416/97 R |
| 8,398,370 B1 | 3/2013 | Liang |
| 2003/0133797 A1 * | 7/2003 | Dailey ........................ 416/97 R |
| 2004/0096313 A1 * | 5/2004 | Harvey et al. ................. 415/115 |
| 2006/0042255 A1 * | 3/2006 | Bunker et al. ................... 60/752 |
| 2008/0089787 A1 | 4/2008 | Abdel-Messeh et al. |
| 2009/0087312 A1 * | 4/2009 | Bunker et al. ................... 416/95 |
| 2012/0014808 A1 | 1/2012 | Lee |
| 2013/0142666 A1 | 6/2013 | Lee et al. |

* cited by examiner

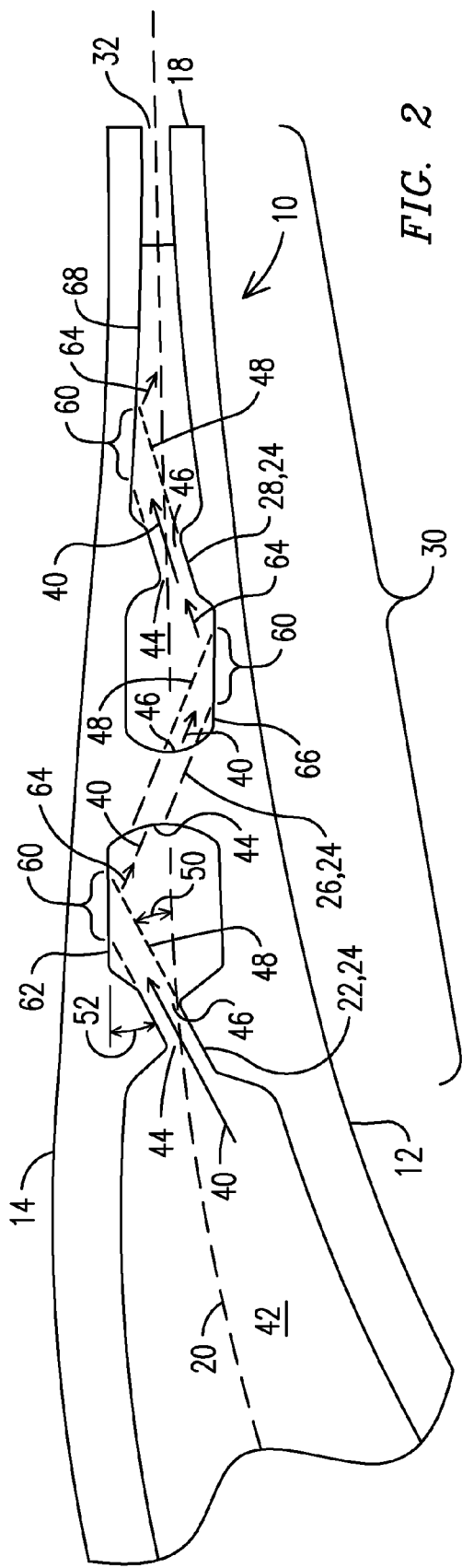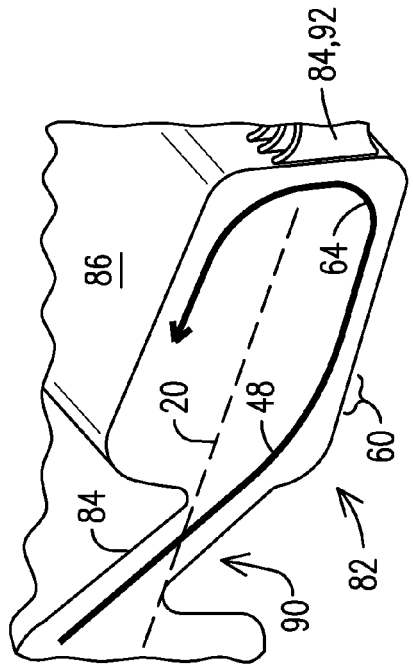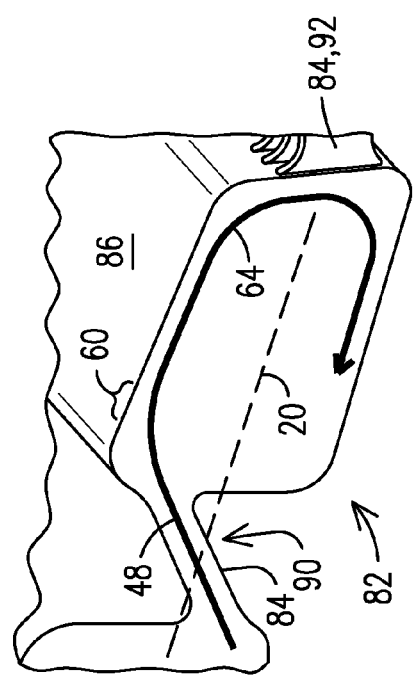

TRAILING EDGE COOLING USING ANGLED IMPINGEMENT ON SURFACE ENHANCED WITH CAST CHEVRON ARRANGEMENTS

STATEMENT REGARDING FEDERALLY SPONSORED DEVELOPMENT

Development for this invention was supported in part by Contract No. SC0001359 awarded by the United States Department of Energy. Accordingly, the United States Government may have certain rights in this invention.

FIELD OF THE INVENTION

The invention relates to cooling of a turbine airfoil's trailing edge that can be cast using a ceramic core. Specifically, the invention discloses using angled impingement cooling jets to target cast-in surface features.

BACKGROUND OF THE INVENTION

Conventional turbine airfoils used in blades and vanes of gas turbine engines have a trailing edge that is thin for aerodynamic efficiency. However, a lack of cooling surface area on the interior makes it difficult to cool the thin trailing edge. The trailing edge is typically cast integrally with the entire blade by using a ceramic core. The features and size of the ceramic core are reflected in the trailing edge. However, core design considerations must be weighed against trailing edge design considerations. For example, larger core features that create impingement channels in the trailing edge are better for core strength, but larger impingement channels mean reduced flow metering. Hence, a well designed core that balances core considerations with trailing edge cooling requirements is a key aspect of a well designed trailing edge design.

Impingement cooling along the mean camber line in a turbine airfoil trailing edge is known. In this arrangement orifices are cast as part of the trailing edge and are oriented with the mean camber line create high-speed impingement jets of cooling fluid. These impingement jets may impinge a surface between adjacent downstream impingement orifices, and this results in an increased heat transfer rate. Single, double, or triple impingement may occur before the spent cooling fluid is exhausted from the trailing edge into the combustion gas path. The series of impingement orifices also act to meter the flow and this provides a more efficient use of the cooling fluid.

By virtue of their location on the mean camber line the impingement orifices are located between the concave interior surface on the suction side and the convex interior surface on the pressure side of the airfoil. Prior cooling schemes have improved heat transfer by angling the impingement orifices such that they produce impingement jets that impinge the concave and convex interior surfaces. This, in turn, cools the respective exterior surfaces of the trailing edge. Other prior cooling schemes place various surface features on the interior surfaces coincident with the impingement jets. However, operating temperatures of gas turbine engines continue to increase. This leaves room in the art for improvements to cooling of the trailing edge.

BRIEF DESCRIPTION OF THE DRAWINGS

The invention is explained in the following description in view of the drawings that show:

FIG. 2 is a close-up of the trailing edge of FIG. 1.

FIG. 5 schematically depicts in a perspective view a flow of cooling fluid that will result in the trailing edge, where the flow is superimposed on plane 5-5 of the core of FIG. 4.

FIG. 6 schematically depicts in a perspective view a flow of cooling fluid that will result in the trailing edge, where the flow is superimposed on plane 6-6 of the core of FIG. 4.

DETAILED DESCRIPTION OF THE INVENTION

The present inventors have developed a cooling arrangement for a turbine airfoil's trailing edge, where the trailing edge and all elements of the cooling arrangement are integrally cast with the airfoil using a ceramic casting core. The invention capitalizes on advances in casting core technology to form an arrangement where the elements harmonize to form an unexpectedly extremely efficient cooling arrangement. Specifically, the airfoil and trailing edge are cast around a ceramic casting core configured to form impingement orifices and chevrons within the trailing edge. Some of the impingement orifices direct impingement jets toward chevrons disposed on an interior surface on the pressure side of the airfoil. Other impingement orifices direct impingement jets toward chevrons disposed on an interior surface on the suction side. There may be one or several rows of impingement orifices. Spent impingement air exhausts from the trailing edge into the flow of combustion gases. Compared to impingement jets all pointing in the same direction, alternating the target of the impingement jest from suction side to pressure side not only helps to increase t he surface area being cooled, but it also serves to strengthen the trailing edge section of the ceramic core, thereby increasing production yield while allowing the diameter of the impingement jets to be smaller. Moreover, the use of chevrons not only increases surface area, but it also serves to spread the cooling air in order to more evenly cool the surface and to increase the area being cooled effectively when compared to traditional turbulators or parallel grooves.

Figure 1:
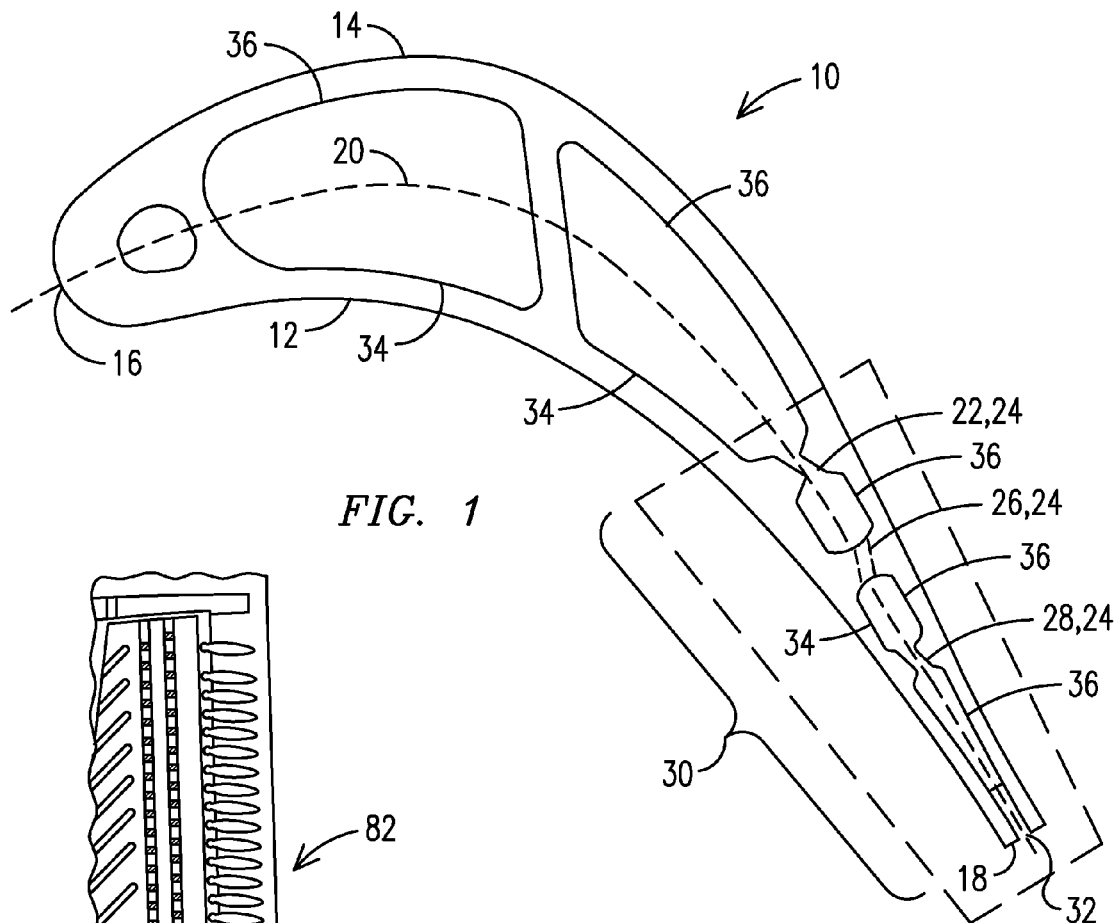
FIG. 1 is a schematic cross section of an exemplary embodiment of an airfoil disclosed herein.

FIG. 1 shows an exemplary embodiment of an airfoil 10 having a pressure side 12, a suction side 14, a leading edge 16, a trailing edge 18, a mean camber line 20, a first row 22 of impingement orifices 24, a second row 26 of impingement orifices 24, and a third row 28 of impingement orifices 24, where each row 22, 26, 28 is oriented radially in the gas turbine engine from a base of the airfoil 10 to a tip of the airfoil 10. The rows 22, 26, 28 are disposed in a trailing edge portion 30 of the airfoil 10. Cooling fluid enters the first row 22 of impingement orifices and exits the trailing edge portion 30 via exhaust orifices 32. The pressure side 12 is cooled via cooling of a pressure side interior surface 34, and the suction side 14 is cooled via a cooling of a suction side interior surface 36.

FIG. 2 shows a close-up of the trailing edge portion 30 of FIG. 1. Within this cross section fresh cooling fluid 40 from an upstream cavity 42 within the airfoil 10 enters an impingement orifice inlet 44 of an impingement orifice 24 of the first row 22, and travels through and exhausts from the impingement orifice 24 via an impingement orifice outlet 46 in the form of an impingement jet 48. A center of the impingement orifice outlet 46 of the impingement orifice 24 of the first row 22 is disposed on the suction side 14 of the mean camber line 20, although it need not necessarily be so long as the respective impingement jet 48 is directed at an angle 50 to the mean camber line 20. In this cross section the impingement jet 48 of the first row 22 is directed toward a target area 60 on a concave first-row interior surface 62 on the suction side 14 at an angle of impingement 52. A surface feature (not shown) or plural surfaces features are positioned such that at least a portion of the surface feature is within the target area 60.

Spent cooling fluid 64 from the impingement jet 48 of the first row 22 becomes fresh cooling fluid 40 for the second row 26. The fresh cooling fluid 40 enters the impingement orifice inlet 44 of an impingement orifice 24 of the second row 26, and travels through and exhausts from the impingement orifice 24 via an impingement orifice outlet 46 in the form of an impingement jet 48. The impingement orifice inlet 44 of the impingement orifice 24 of the second row 26 may be at a different elevation than the impingement orifice outlet 46 of the impingement orifice 24 of the first row 22, and hence the impingement orifice 24 of the second row 26 is represented using dotted lines. A center of the impingement orifice outlet 46 of the impingement orifice 24 of the second row 26 is disposed on the pressure side 12 of the mean camber line 20, although it need not necessarily be so long as the respective impingement jet 48 is directed at an angle to the mean camber line 20. In this cross section the impingement jet 48 of the second row 26 is directed toward a target area 60 on a convex second-row interior surface 66 on the pressure side 12. A surface feature (not shown) or plural surfaces features are positioned such that at least a portion of the surface feature is within the target area 60.

Spent cooling fluid from the impingement jet 48 of the second row 26 becomes fresh cooling fluid 40 for the third row 28. The fresh cooling fluid 40 enters the impingement orifice inlet 44 of an impingement orifice 24 of the third row 28, and travels through and exhausts from the impingement orifice 24 via an impingement orifice outlet 46 in the form of an impingement jet 48. The impingement orifice inlet 44 of the impingement orifice 24 of the third row 28 may be at a same elevation as the impingement orifice outlet 46 of the impingement orifice 24 of the first row 22, and hence the impingement orifice 24 of the third row 28 is represented using solid lines. A center of the impingement orifice outlet 46 of the impingement orifice 24 of the third row 28 is disposed on the suction side 14 of the mean camber line 20, although it need not necessarily be so long as the respective impingement jet 48 is directed at an angle to the mean camber line 20. In this cross section the impingement jet 48 of the third row 28 is directed toward a target area 60 on a concave third-row interior surface 68 on the suction side 14. A surface feature (not shown) or plural surfaces features are positioned such that at least a portion of the surface feature is within the target area 60. Spent cooling fluid 64 from the impingement jet 48 of the third row 28 exhausts from the trailing edge portion 30 via the exhaust orifices 32.

In this exemplary embodiment, the rows 22, 26, 28 within this cross section alternate from suction side 14 to pressure side 12 to suction side. It is possible that all three rows 22, 26, 28 in a single cross section may be directed to the same side, or they may point to different sides but not necessarily in an alternating pattern as shown. For example, in an alternate exemplary embodiment the first row 22 and the second row may point to the pressure side 12 while the third row may point to the suction side 14. Any combination may be envisioned. Likewise, the arrangement seen may vary as the location of the cross section is varied from base to tip of the airfoil 10.

Figure 3:
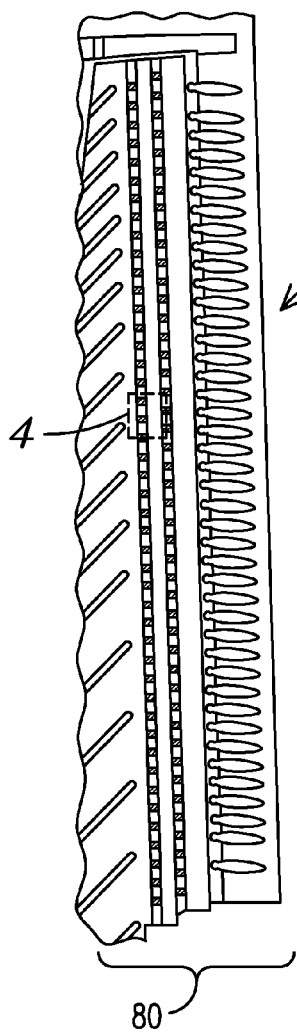
FIG. 3 is a schematic side view of a trailing edge portion of a casting core used to form an exemplary embodiment of a trailing edge.
Figure 4:
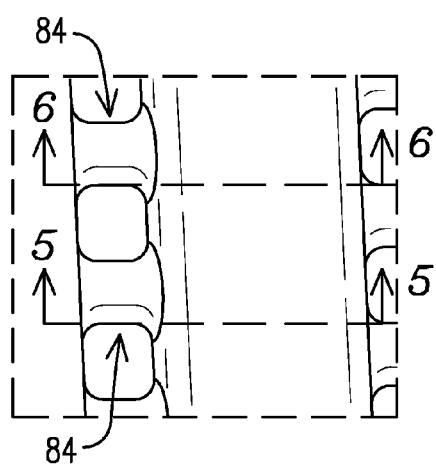
FIG. 4 is a close-up of impingement-orifice-forming core features of FIG. 3.

FIG. 3 is a side view of a trailing edge portion 80 of a casting core 82 used to form an alternate exemplary embodiment of a trailing edge portion 30 configured for double impingement. The casting core may be made of a ceramic material. FIG. 4 is a close up of a region within the trailing edge portion 80 of FIG. 3 having impingement-orifice-forming structures 84 that form the impingement orifices 24 within the airfoil 10 when the casting core 82 is removed.

FIG. 5 schematically depicts in a perspective view a portion of the casting core ending at line 5-5 of FIG. 4, with a line representing a path that a flow of cooling fluid may take at the same location within the airfoil 10. In other words, an outer surface 86 of the casting core 82 is being modeled as an inner surface of the airfoil 10 it forms. FIG. 6 is similar to FIG. 5, but taken along line 6-6 of an impingement-orifice-forming structure 84 that is immediately adjacent the impingement-orifice-forming structure 84 of line 5-5. When comparing FIG. 5 to FIG. 6, it is apparent that in this exemplary embodiment, adjacent impingement-orifice-forming structures 84 within a first row 90 of impingement-orifice-forming structures 84 alternate which side they point to. They may alternate every-other as shown, or they may alternate in other groups, such as two pointing to one side, and then two pointing to another side etc.

Also visible in FIGS. 5 and 6 is a second row 92 of impingement-orifice-forming structures 84. In this view it can be seen that the first row 90 and the second row are offset vertically (i.e. from the base of the airfoil to the tip of the airfoil). This makes the path taken by the cooling fluid more tortuous and hence more efficient.

Figure 7:
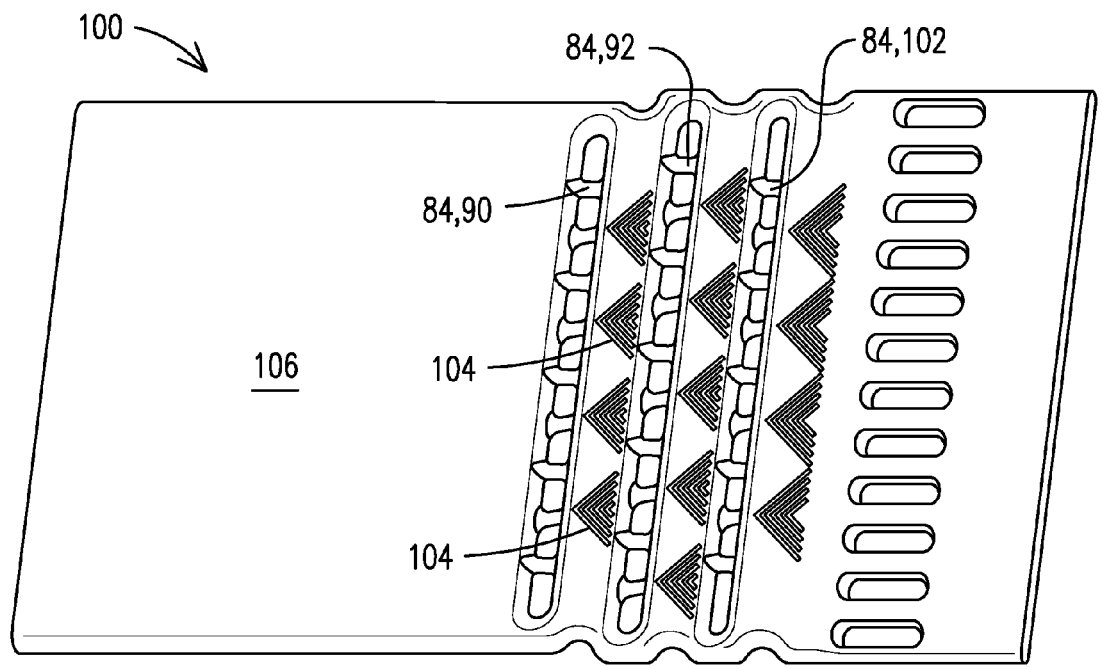
FIG. 7 shows a casting core coupon used to form the cooling arrangement described herein.

FIG. 7 shows a casting core coupon 100 that demonstrates the cooling arrangement to be used in the trailing edge portion 30. This exemplary embodiment employs a triple impingement cooling arrangement that includes the first row 90, the second row 92, and a third row 102 of impingement-orifice-forming structures 84. Chevron arrangement forming structures 104 can be seen formed in an outer surface 106 of the casting core coupon 100 and are configured to form chevron arrangements in the inner surfaces of the trailing edge portion 30. It can be seen that within each row 90, 92, 102 the impingement-orifice-forming structures 84 alternate their direction. It can also be seen that the chevron arrangement forming structures 104 are coordinated with the impingement-orifice-forming structures 84 so that impingement jets will direct cooling fluid onto respective chevron arrangements.

Figure 8:
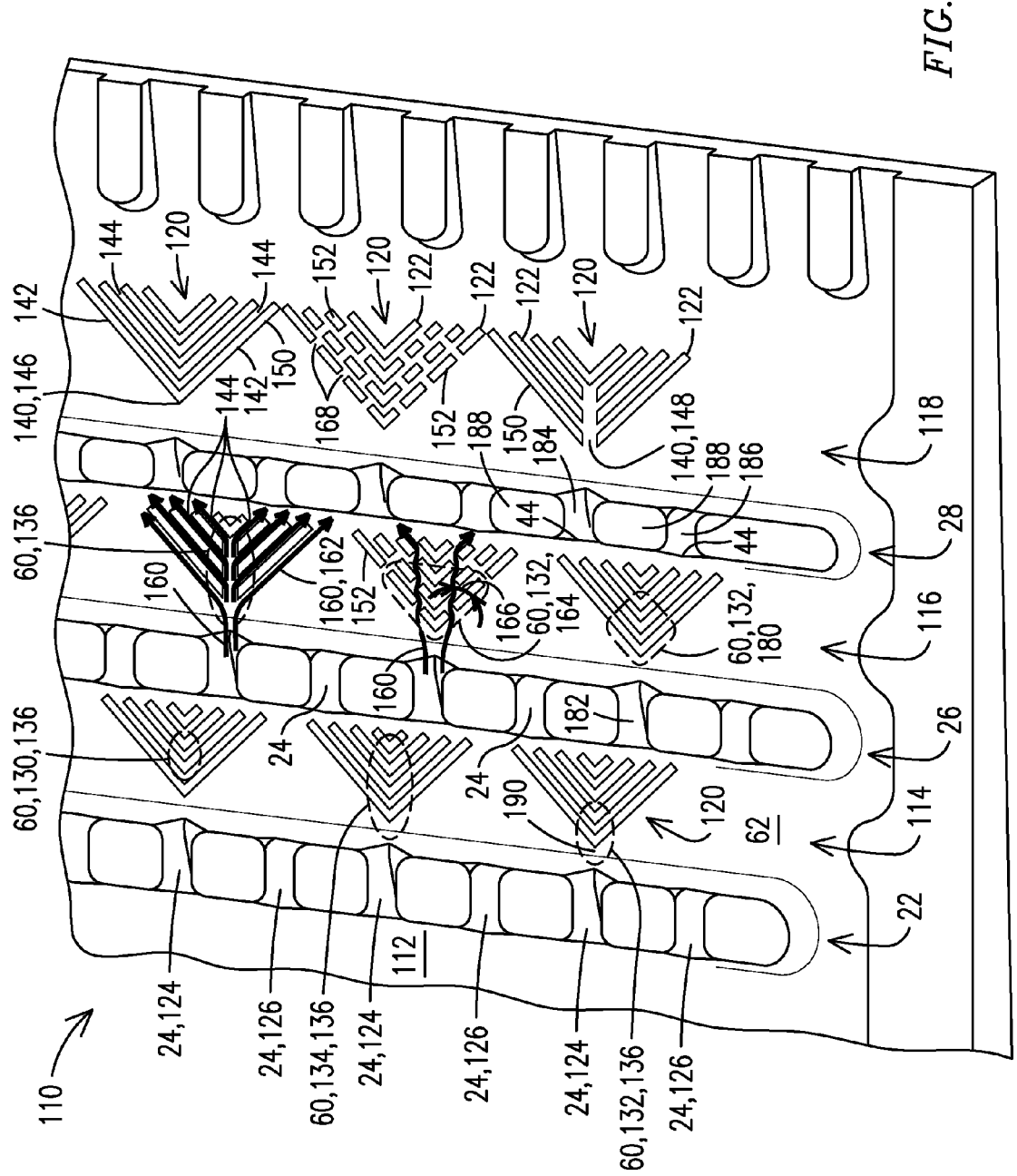
FIG. 8 shows a cross section of a casting made using the casting core coupon of FIG. 7.

FIG. 8 shows a cross section of a portion of a casting 110 made using the casting core coupon 100 of FIG. 7. A void 112 exists where the casting core coupon 100 was formerly present and this void 112 represents the upstream cavity 42 that supplies fresh cooling fluid 40 to the first row 22 of impingement orifices 24. Also visible are the second row 26 and the third row 28 of impingement orifices 24, and a first row 114, a second row 116, and a third row 118 of chevron arrangements 120. Each chevron arrangement 120 may have one or more than one individual chevrons 122. Using the first row 22 of impingement orifices 24 to explain a configuration of each row, it can be seen that there are first group impingement orifices 124 oriented into the page and second group impingement orifices 126 oriented out of the page. The first group impingement orifices 124 can be likened to impingement orifices that direct an impingement jet 48 toward a target area 60 on the concave first-row interior surface 62 on the suction side 14. Similarly, the second group impingement orifices 126 can be likened to impingement orifices that direct an impingement jet 48 toward a target area 60 on a convex first-row interior surface on the pressure side 12 (not visible in this view).

The impingement orifices 24 may be circular in cross section, but because they are angled toward the first-row interior surface 62 impingement orifices 24 with a circular cross section form an oval-shaped target area 60. The target area 60 may range in size, and may include smaller 130, mid-range 132, and larger 134 target areas, where the size is relative to how much of the chevron arrangement 120 lies within the target area 60. A shape of a perimeter 136 of the target area 60 may be varied by varying a shape of the cross section of the impingement orifice 24 itself. For example, if the cross section of the impingement orifice were oval with a longer axis oriented in and out of the page, the ovality of the perimeter 136 would be increased from that produced by the impingement orifice having the circular cross section. Conversely, if the ovality of the cross section were oriented such that the longer axis was more parallel to the first-row interior surface 62, then the shape of the perimeter 136 would be more circular. Likewise, by changing the angle of impingement 52 the ovality of the perimeter 136 can be changed. The shape of the cross section of the impingement orifice 24 and the angle of impingement 52 can be manipulated as necessary to achieve whatever shape is desired for the perimeter 136 of the target area 60. In addition, the shape of the perimeter 136 may be the same for all target areas 60, or some or all of the target areas 60 may have their own, unique perimeter shape. These perimeter shapes may be selected to accommodate local cooling requirements and local geometries etc.

Each chevron 122 includes a tip 140 and two wings 142. Adjacent chevrons 122 form a groove 144 there between that may be used to guide the cooling fluid. The tip 140 may be a closed tip 146 or an open tip 148. The wings 142 may be continuous 150 or discontinuous 152. The configuration of chevron arrangements 120 may vary from one chevron arrangement 120 to the next and may be selected to accommodate local cooling requirements and local geometries etc. The chevrons 122 may span an entirety of its target area 60, or the target area 60 may be larger than the span of the chevron 122. The tip 140 of one or all chevrons 122 in chevron arrangement 120 may be disposed within the target area 60.

Spent cooling fluid 64 may flow in the grooves 144 formed by the wings 142 of the chevrons 122. These grooves 144 may be oriented so that they guide the spent cooling fluid 64 along a same path the spent cooling fluid 64 would have taken if the chevron arrangement 120 were not present. In other words, streamlines 160 present in the spent cooling fluid 64 would naturally follow a course if the chevron arrangement 120 were not present. The chevron arrangement 120 can be configured so that the wings 142 and/or the grooves 144 follow the same streamlines as shown in chevron arrangement 162. The result is that the spent cooling fluid 64 will lose little or no energy as a result of the presence of the chevron arrangement 120, but will benefit from the increased surface area created by the chevron arrangement.

Alternately, the wings 142 and/or the grooves 144 can be disposed at an angle to the streamlines 160 that the spent cooling fluid 64 would naturally form, as shown in chevron arrangement 164. This configuration forces the spent cooling fluid 64 to flow over the wings 142 and this creates turbulence, thereby increasing a cooling effect. A length of the wings 142 and a wing angle 166 of the wing 142 to the natural streamline 160 need to be designed to strike a balance between a desire to increase turbulence, and hence increase a cooling efficiency, and a desire to reduce a boundary layer that may form on a downstream side of the wing 142, which forms at longer wing 142 lengths and greater wing angles 166. The wing angle 166 will also determine how well the created turbulence follows the wings 142 and/or grooves, which also affects heat transfer. Similarly, if the wing 142 is discontinuous, a length between gaps 168 needs to be selected to maximize cooling effectiveness by balancing turbulence creation with boundary layer formation.

In an exemplary embodiment the wings 142 and/or the grooves 144 can be configured to guide spend cooling fluid 64 toward the impingement orifice inlet 44 of a subsequent impingement orifice 24. For example, chevron arrangement 180 guides spent cooling fluid 64 from second row impingement orifice 182 toward impingement orifice inlets 44 of third row impingement orifices 184, 186. This may be done to improve flow efficiency through the trailing edge portion 30. Alternately, the wings 142 and/or the grooves 144 can be configured to guide spent cooling fluid 64 toward interstitial structure 188 between impingement orifice 24 should greater fluidic chaos be desired at that location.

In an exemplary embodiment the cooling arrangement may be configured such that a stagnation point 190 within a target area 60 is arranged upstream of the tip 140 of one or all chevrons 122 in the chevron arrangement 120. Doing so ensures spent cooling fluid 64 flows along the wings 142 and/or the grooves 144 away from the tips 140 as opposed to flowing upstream toward the tips 140, which ensures a more uniform flow.

Figure 9:
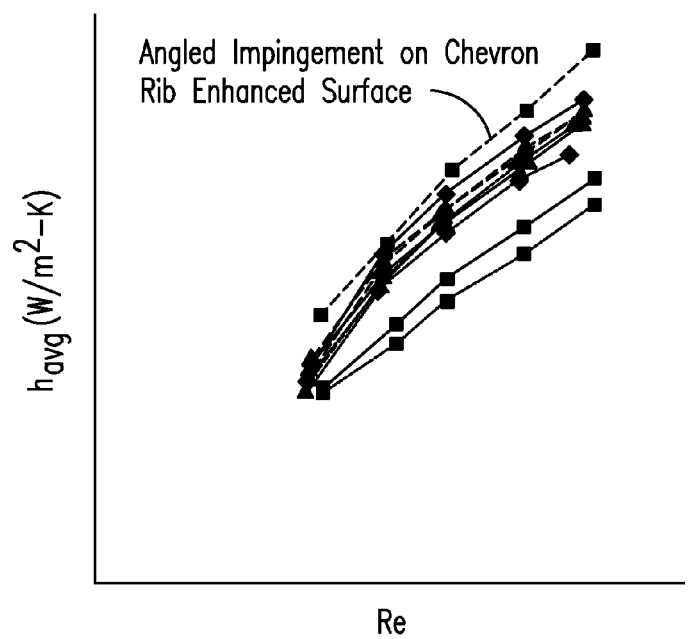
FIG. 9 shows heat transfer results using the casting core coupon of FIG. 7.

Various cooling arrangements with other surface features and flow paths were considered but this combination of multiple rows of angled impingement on respective chevron ribs provided the greatest heat transfer rate, resulting at least from the increased surface area and increased turbulence, while allowing formation of the trailing edge portion 30 integral to the airfoil 10 using a casting core 82 (which may be made of a ceramic material). The improved heat transfer test results using the arrangement disclosed herein can be seen in FIG. 9. When compared to results from other configurations, all of which are below the results from the configuration disclosed herein, it become apparent that this increased cooling represents an improvement in the art.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A gas turbine engine component, comprising:
a pressure side comprising an interior surface;
a suction side comprising an interior surface;
a trailing edge portion;
a plurality of suction side and pressure side impingement orifices disposed in the trailing edge portion,
wherein each suction side impingement orifice is configured to direct an impingement jet at an acute angle onto an elongated target area that encompasses a tip of a chevron within a chevron arrangement formed in the suction side interior surface,
wherein each pressure side impingement orifice is configured to direct an impingement jet at an acute angle onto a target area that encompasses a tip of a chevron within a chevron arrangement formed in the pressure side interior surface, wherein at least one chevron arrangement comprises a plurality of chevrons, a tip of each chevron of the plurality of chevrons being disposed in the respective target area and wings of the chevrons of the plurality of chevrons forming at least one groove there between in which spent cooling air flows.

2. The component of claim 1, wherein outlets of the suction side impingement orifices are disposed on a suction side of a mean-line, and outlets of the pressure side impingement orifices are disposed on a pressure side of the mean-line.

3. The component of claim 1, wherein for after impinging the tip of the chevron spent impingement air diverges in conjunction with a divergence of wings of the chevron each impinged chevron arrangement.

4. The component of claim 1, wherein the pressure side interior surface, the chevron arrangement formed in the pressure side interior surface and the pressure side are integrally cast.

5. The component of claim 1, wherein at least one chevron is discontinuous.

6. The component of claim 5, wherein the tip of at least one chevron is open.

7. The component of claim 1, wherein at least one chevron is continuous.

8. The component of claim 1, wherein the plurality of suction side and pressure side impingement orifices are disposed in a plurality of rows extending radially from a base to a tip of the airfoil, wherein impingement orifices in consecutive rows are at a different elevation between the base and the tip of the airfoil.

9. The component of claim 1, wherein each impingement orifice is configured to position a stagnation point in the target area upstream of the tip of the respective chevron with respect to a direction of flow of spent impingement air.

10. The component of claim 1, further comprising a second stage of impingement orifices disposed downstream of the plurality of impingement orifices,
wherein each suction side second stage impingement orifice is configured to direct an impingement jet at an acute angle onto an elongated target area that encompasses a tip of a chevron within a chevron arrangement into the suction side interior wall,
wherein each pressure side second stage impingement orifice is configured to direct an impingement jet at an acute angle onto an elongated target area that encompasses a tip of a chevron within a chevron arrangement into the pressure side interior wall, and
wherein spent impingement air from the plurality of impingement orifices is guided by the wings of respective chevrons into respective second stage impingement orifices.

11. The component of claim 10, wherein spent impingement air from each of the plurality of impingement orifices is guided by the wings of the respective chevrons into two respective second stage impingement orifices.

12. A gas turbine engine component, comprising:
an internal surface comprising a chevron arrangement, the chevron arrangement comprising
a plurality of chevrons formed in the internal surface, each chevron comprising a tip and a pair of wings, and
an impingement orifice configured to direct an impingement jet of cooling fluid onto the internal surface at an angle other than perpendicular, wherein a target area of the impingement jet encompasses the tips of all of the plurality of chevrons within the chevron arrangement, and wherein wings of each chevron of the plurality of chevrons diverge in conjunction with a divergence of spent impingement air.

13. The component of claim 12, comprising:
an opposing internal surface; and
a plurality of impingement orifices disposed between the internal surface and the opposing internal surface, wherein some of the plurality of impingement orifices are configured to direct a respective impingement jet of cooling fluid onto the internal surface, wherein some of the plurality of impingement orifices are configured to direct a respective impingement jet of cooling fluid onto the opposing internal surface, wherein a target area of each impingement jet encompasses a tip of a chevron within a respective chevron arrangement on the opposing internal surface, and wherein wings of the respective chevron diverge in conjunction with a divergence of respective spent impingement air.

14. The component of claim 13, wherein the impingement orifices alternate between directing an impingement jet onto the internal surface and directing an impingement jet onto the opposing internal surface.

15. The component of claim 13, wherein the plurality of impingement orifices are disposed in a trailing edge portion of an airfoil, the internal surface is disposed on a suction side of the airfoil, and the opposing internal surface is disposed on the pressure side of the airfoil.

16. The component of claim 12, wherein the chevron is discontinuous.

17. The component of claim 12, wherein the tip of the chevron is open.

18. The component of claim 12, wherein the wings of the chevron are oriented at an angle to streamlines the spent impingement air would naturally follow.

* * * * *